Aug. 18, 1925.
G. B. HANSBURG
1,550,162
CHILD'S VEHICLE WITH SIDE CAR
Filed Dec. 22, 1923 2 Sheets-Sheet 1
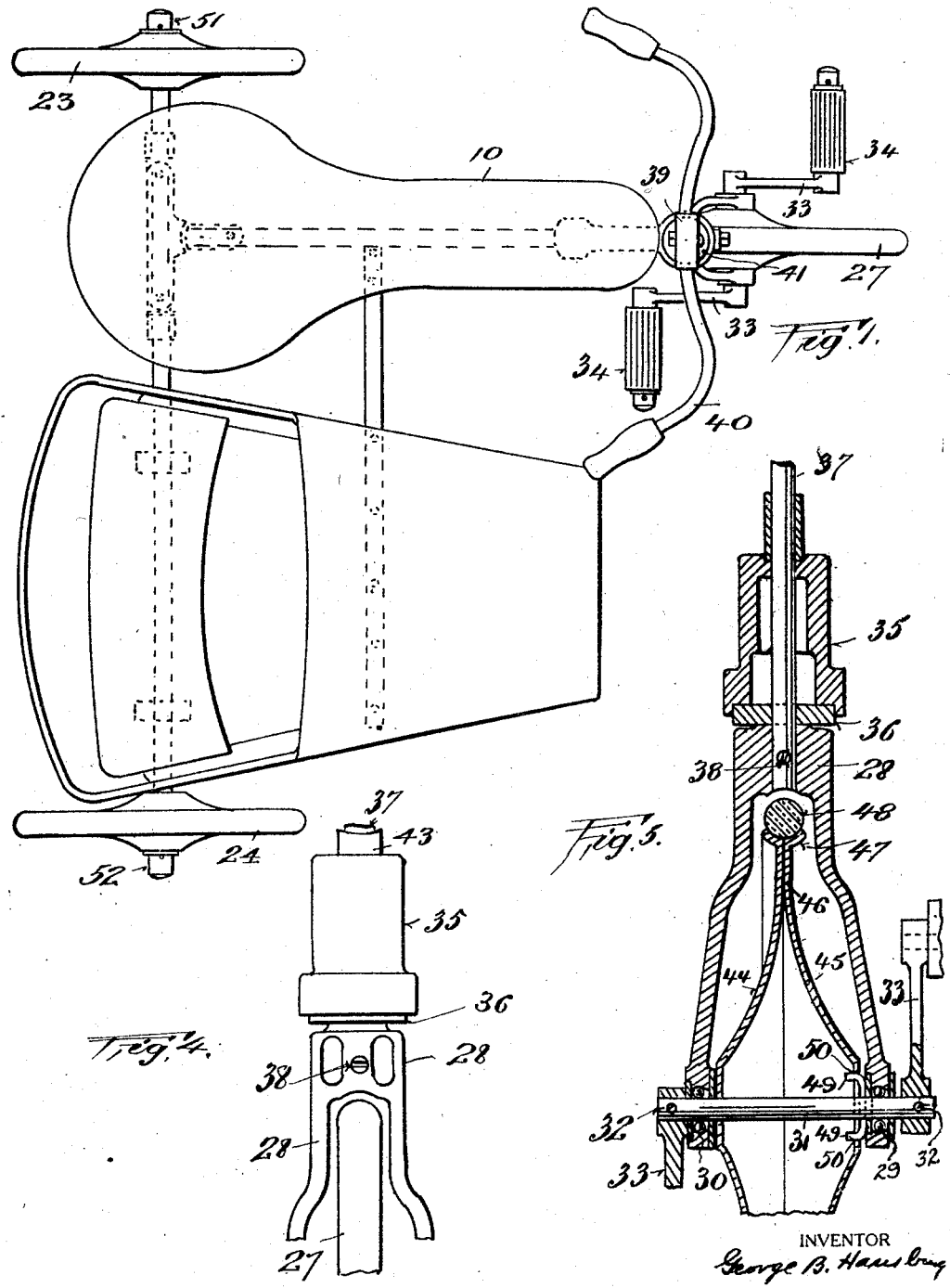
INVENTOR
George B. Hansburg
BY Darby & Darby
his ATTORNEYS

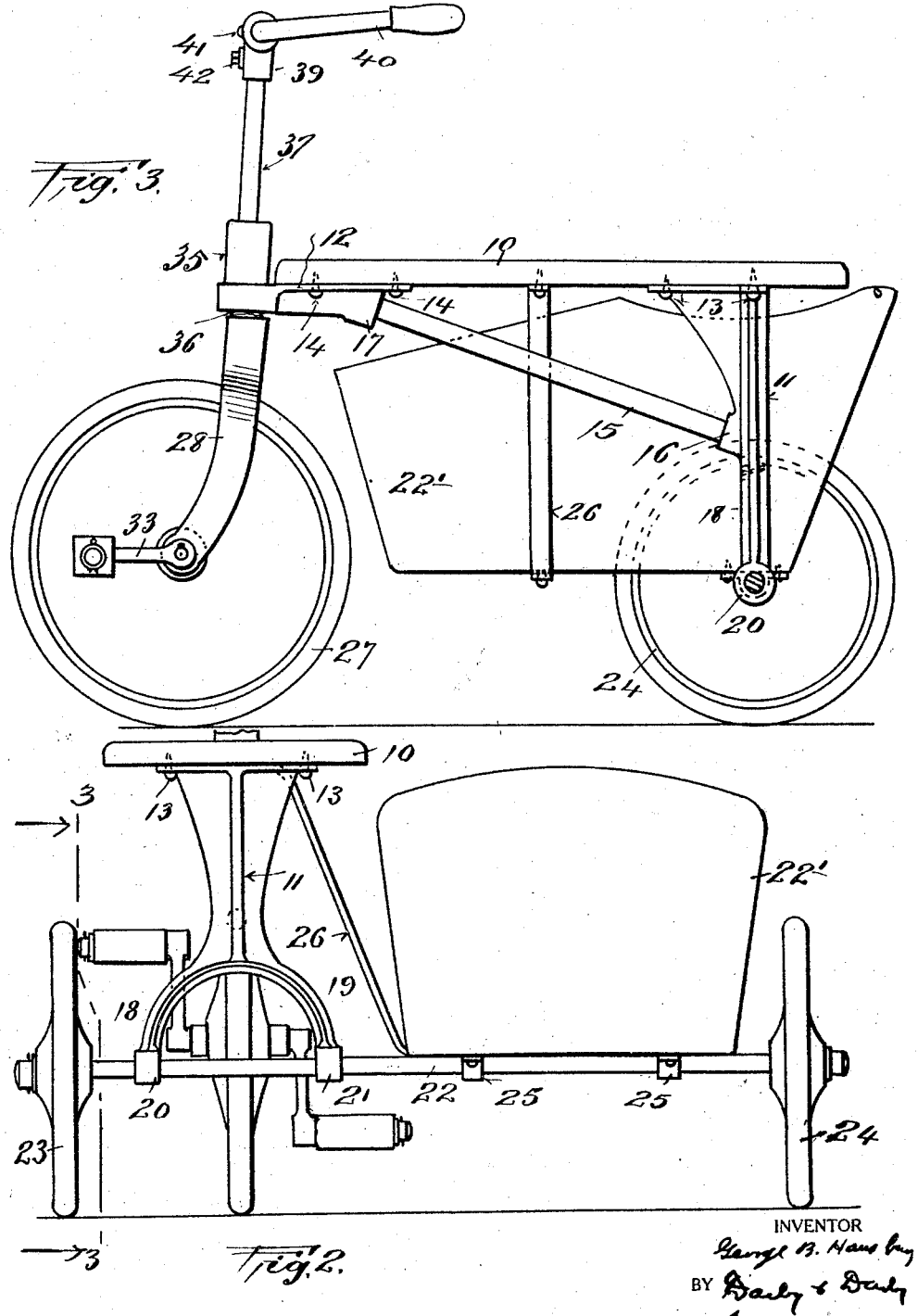

Patented Aug. 18, 1925.

1,550,162

UNITED STATES PATENT OFFICE.

GEORGE B. HANSBURG, OF NEW YORK, N. Y.

CHILD'S VEHICLE WITH SIDE CAR.

Application filed December 22, 1923. Serial No. 682,141.

*To all whom it may concern:*

Be it known that I, GEORGE B. HANSBURG, a citizen of the United States, residing at New York, county of Bronx, State of New York, have made a certain new and useful Invention in Child's Vehicle with Side Car, of which the following is a specification.

This invention relates to an improved childs vehicle with attached side car, and has for its object the production of a vehicle of the type stated which is simple but substantial in construction, easy of operation, and provides a side car for carrying dolls or other objects. It is my further purpose to produce a very attractive though inexpensive vehicle, wherein vehicle is combined with a side car.

Other objects will appear hereinafter and I attain these objects by the device illustrated in the accompanying drawings in which Fig. 1 is a plan view of a device embodying my invention.

Fig. 2 is a rear elevation thereof.

Fig. 3 is a view on lines 3—3 of Fig. 2.

Fig. 4 is a front view of a part of the front wheel, the front fork and steering knuckle.

Fig. 5 is a detail view thereof, partly in section and showing the manner in which the front wheel is mounted.

Similar numerals refer to like parts throughout the drawing.

It is among the prime purposes of my invention to provide a simple and substantial child's vehicle construction wherein a simple vehicle or joy-runner is combined with a doll or utility side car. This joy-runner or vehicle is a health-exerciser and comprises a seat member 10, which is conveniently mounted on a seat supporting frame 11 and the flat extension of the steering head 12 by screws 13 and 14. A suitable brace 15 fitting in sockets 16 and 17, unites the seat frame member 11 and the steering head member 12. The seat supporting member 11 is provided with fork members 18 and 19 which terminate in sockets 20 and 21 for receiving and holding the cross or main axle bar 22. This axle bar is of proper length to provide room for the frame sockets 20 and 21, the side car 22' and the rear wheels 23 and 24. The side car is fastened to the axle by clip 25, 25 near the rear end thereof, and to the vehicle seat by a brace 26 near the front end thereof.

A single front wheel 27 mounted in the steering fork 28 by suitable bearings 29 and 30, guides the vehicle with the car and supports the front thereof through the pedal axle 31. Pedal arms 33 are fastened on the ends of shaft 31 by bolts 32 and the pedal arms are supplied with pedals 34 of rubber or other suitable composition.

As is best shown in Figs. 3 and 5 the front end of the steering head 12 is provided with an extension knuckle 35 which is united with the head and may be cast as a solid piece. A bearing washer is seated in the head 12 and the extension is provided with a bore for the steering post. This steering post may be of any suitable construction as a rod 37, which passes through the head, and washer 36 which is seated in the head and terminates in the fork 28 to which it is fastened by a bolt 38. The upper end of the steering post carries the handle bar socket 39 in which is adjustably held the handle bar 40 by a suitable adjusting screw 41. A lock screw 42 secures the socket to the steering post. A sleeve 43 fits over the steering post 37 and makes a neat finish as is shown in Figs. 4 and 5.

The wheels are of the two disk type and comprise two similar parts 44 and 45 which are spot welded at their points of union 46 and terminate in a trough seat 47 for receiving a rubber tire 48. The front wheel is secured to the pedal axle by a key 49 passing through a bore in shaft 31 and having its ends located in suitable holes 50, whereby the wheel is quickly assembled and secured.

The rear wheels 23 and 24 are similar to the front wheel, except, of course, these are not keyed to the axle but are mounted to rotate thereon and are held in place by caps 51 and 52 on the end of the axle.

In operation the vehicle may be used as a tricycle when it is propelled by the pedals 34, or as a scooter when it is used by standing on the seat 10. The side car in either case, rides easily and affords convenient means for carrying a child's doll, or for packages, or even a companion, thereby affording a source of much pleasure, health and amusement.

Having now described my invention, what I claim as new and useful and of my own invention, and desire to secure by Letters Patent, is—

1. The combination, in a vehicle, of a frame body having a T-member, an axle bar supported by said T-member and extending beyond said member, wheels on said axle bar, a side car, carried on said axle bar, a strap for supporting one end of said car, a guide member carried by said frame, an axle rotatably mounted in said guide member and a wheel locked on the axle.

2. In a child's vehicle, a frame comprising a seat member, a seat supporting member, an axle bar rigidly held by said seat supporting member, a steering head and knuckle on said seat member, sockets in said head and seat supporting member, and a brace bar in said sockets.

3. In a scooter vehicle, a frame comprising a seat member, a seat supporting member, an axle bar rigidly held by said seat supporting member, a side car on said axle bar, a steering head and knuckle secured to said seat, guide forks held on said steering head, a wheel on said fork and a handle bar for guiding said fork and wheel.

4. In a scooter vehicle, a frame comprising a seat member, a seat supporting member, an axle bar rigidly held by said seat supporting member, a side car on said axle bar, a steering head and knuckle secured to said seat, guide forks held on said steering head, a wheel on said forks, said guide forks being curved to permit each wheel to be turned through 180° and run with the fork curvature being directed either forward or rearward.

5. In a scooter vehicle, a frame, a seat on said frame, a side car on said frame, a steering head also on said frame, a guide rod extending through said head, a steering fork on said guide rod, ball bearings in said steering fork, said bearings forming a part of said fork, a wheel axle supported by said bearings, and a two-point key for locking said wheel to said axle.

In testimony whereof I have hereunto set my hand on this 14th day of November A. D., 1923.

GEORGE B. HANSBURG.